United States Patent [19]

Sarkar

[11] 4,310,340
[45] Jan. 12, 1982

[54] METHOD AND APPARATUS FOR MAKING OPTICAL FIBER WAVEGUIDES

[75] Inventor: Arnab Sarkar, Big Flats, N.Y.

[73] Assignee: Corning Glass Works, Corning, N.Y.

[21] Appl. No.: 172,068

[22] Filed: Jul. 24, 1980

[51] Int. Cl.³ .................... C03B 37/07; C03B 37/075
[52] U.S. Cl. ...................................... 65/3.12; 65/144; 65/157; 65/18.2; 427/163; 427/237; 118/724; 118/725
[58] Field of Search ............... 65/3.12, 144, 157, 18.2; 427/163, 167, 223, 237; 118/47, 724, 725

[56] References Cited

U.S. PATENT DOCUMENTS

| | | | |
|---|---|---|---|
| 4,117,802 | 10/1978 | Le Sergent et al. | 427/237 X |
| 4,233,045 | 11/1980 | Sarkar | 65/60 D |
| 4,235,616 | 11/1980 | Siegfried | 65/3.12 |
| 4,263,032 | 4/1981 | Sinclair et al. | 65/3.12 |

FOREIGN PATENT DOCUMENTS 2922795 12/1979 Fed. Rep. of Germany .
1459199 12/1976 United Kingdom .

Primary Examiner—Richard V. Fisher
Attorney, Agent, or Firm—William J. Simmons, Jr.

[57] ABSTRACT

A glass optical waveguide preform is prepared by chemical reaction of vapor ingredients within a bait tube. As the reactants flow through the bait tube, a hot zone traverses the tube to cause the deposition of soot in a section of the tube just downstream of the hot zone. An axially disposed tubular burner, which is located just upstream from the hot zone, is mechanically coupled to the burner which generates the hot zone. The burner generates an axial water-free flame that extends through the hot zone. The flame creates a mandrel which confines the flow of reactants to an annular channel adjacent the bait tube wall in the hot zone. The flame also extends downstream from the hot zone where it increases the thermal gradient between the axis and the wall of the bait tube, thereby enhancing the thermophoresis effect, whereby deposition rate and efficiency are improved.

10 Claims, 6 Drawing Figures

METHOD AND APPARATUS FOR MAKING OPTICAL FIBER WAVEGUIDES

BACKGROUND OF THE INVENTION

The present invention relates to an improved apparatus for forming blanks from which optical waveguide fibers are drawn.

Certain glass making processes, particularly vapor deposition processes, have been commonly employed in the formation of optical waveguide blanks. In one such process, the source material vapor is directed into a heated tube wherein it reacts to form a material which is deposited in successive layers. The combination of deposited glass and tube is collapsed to form a draw blank which can be later heated and drawn into an optical waveguide fiber.

In order to obtain uniform deposition along the length of the substrate tube, a serial deposition process has been employed. That is, reactants are fed into the end of the tube, but deposition occurs only in a narrow section of the tube immediately downstream from the zone which is heated by a flame. The flame moves up and down the tube to move the reaction and thus the region of glass deposition serially along the tube.

One of the limitations of such a process is a comparatively low effective mass deposition rate. To increase the deposition rate it appears to be necessary to increase the inside diameter of the substrate tube to provide a greater collection surface area. However, since heat is supplied from the outside of the tube, a larger tube diameter results in a lower vapor temperature at the axis of the tube. Moreover, the flow profile across the tube is such that maximum flow occurs axially within the tube. As tube diameter increases, a smaller portion of the reactant vapor flows in that region of the tube adjacent the wall where reaction products are more readily collected on the inner surface of the tube.

Various attempts have been made to increase the deposition efficiency and the rate at which glass is deposited on the inner surface of the bait tube. In U.S. Pat. No. 4,117,802 a hollow cylindrical element is inserted into the downstream end of the bait tube, the closed end of the cylindrical element terminating in the hot zone. The reactants are caused to flow around the cylindrical element and are therefore channeled close to the heated bait tube. Thus, a greater portion of the reactants are said to react and form a part of the glassy deposit on the inner surface of the bait tube. A coolant gas flows through the cylindrical element for the stated purpose of reducing the amount of glass deposited on its surface. It has been found that the effect of the coolant gas would be to increase the deposition of glass soot on the cylindrical member, thus reducing the amount of glass soot available to be deposited on the inner surface of the bait tube and eventually adversely restricting the flow of gases through the annular channel between those two cylindrical members.

An apparatus for increasing the efficiency of glass deposition in a vapor deposition process for making optical waveguide preforms is taught in my copending U.S. patent application Ser. No. 913,754 filed June 8, 1978 and entitled "Method of Making Large Diameter Optical Waveguide Preforms", the corresponding West German application having been published Dec. 13, 1979 as No. 2,922,795. A baffle tube extends into that end of the bait tube into which the reactants flow. The baffle tube, which traverses the bait tube along with the burner, ends just short of the hot zone so that no soot is deposited thereon. A gas flowing from the baffle tube creates a gaseous mandrel which confines the flow of reactant vapors to an annular channel adjacent the bait tube wall in the hot zone, thereby increasing deposition rate and efficiency.

Another apparatus which was developed for the purpose of increasing the efficiency of glass deposition in a vapor deposition process is taught in my copending U.S. patent application Ser. No. 963,837 filed Nov. 27, 1978 and entitled "Apparatus and Method for Making Optical Filament Preform", now U.S. Pat. No. 4,233,045. A reactant feed tube extends into one end of the bait tube and terminates just short of the hot zone where reaction occurs. The end of the feed tube traverses the bait tube along with the burner which generates the hot zone. Reactants flow radially from slots in the end of the wall of the feed tube and combine with a flushing gas to form a mixture which flows in a spiral path through the hot zone.

U.S. patent application Ser. No. 38,775 filed May 14, 1979 and entitled "Optical Waveguide Manufacturing Process and Article", now U.S. Pat. No. 4,235,616 teaches another apparatus for increasing deposition efficiency. A hollow cylindrical substrate is provided within which is disposed a burner having a substantially radial flame. Reactants are flowed into the hollow cylindrical substrate in the annular space between the inner surface of the substrate and the exterior of the burner. A hot zone is established within the interior of the substrate in the vicinity of the radial flame so that the reactants are reacted to produce a suspension of particulate material. Also, a shield may be provided surrounding the burner within the hollow substrate, and a stream of gas flowed within the shield around the burner to confine the flow of particulate material to an annular channel adjacent to the inner surface of the substrate increasing deposition efficiency of the particulate material on the inside surface of the substrate.

It is therefore an object of the present invention to improve the deposition efficiency of a process whereby a reactant vapor flows into and reacts within a heated tube to form a layer therein.

Another object is to provide an efficient vapor deposition process which is not subject to flow-impeding glass buildups that are inherent in certain prior art processes.

SUMMARY OF THE INVENTION

Briefly, the present invention relates to an apparatus for manufacturing a preform which is intended to be subsequently drawn into an optical fiber waveguide. This apparatus is of the type that includes means for supporting a first tube, and first heating means for heating a portion of the first tube to form a hot zone therein. The apparatus includes means for providing relative longitudinal movement between the first tube and the heating means. Means are provided for introducing into the first tube a reactant gas mixture which flows through the hot zone, and when heated therein, forms particulate material, at least a portion of which flows downstream from the hot zone where at least a portion thereof comes to rest and forms a deposit on the inner surface of the first tube in a region thereof that is cooler than that portion of the first tube that surrounds the hot zone. The improvement of the present invention comprises flowing an unconfined stream of gas through the axial region of said substrate in the hot zone thereof so that said stream is the sole mechanism that acts to confine the flow of said vapor mixture to an annular channel adjacent the substrate surface. The temperature of said gas is sufficiently high that it enhances the thermal gradient that normally exists downstream of the hot zone. The thermophoresis effect is therefore increased, and an increased portion of the particulate matter is forced to deposit on the first tube downstream from the hot zone.

DESCRIPTION OF THE PREFERRED EMBODIMENT

Figure 1:
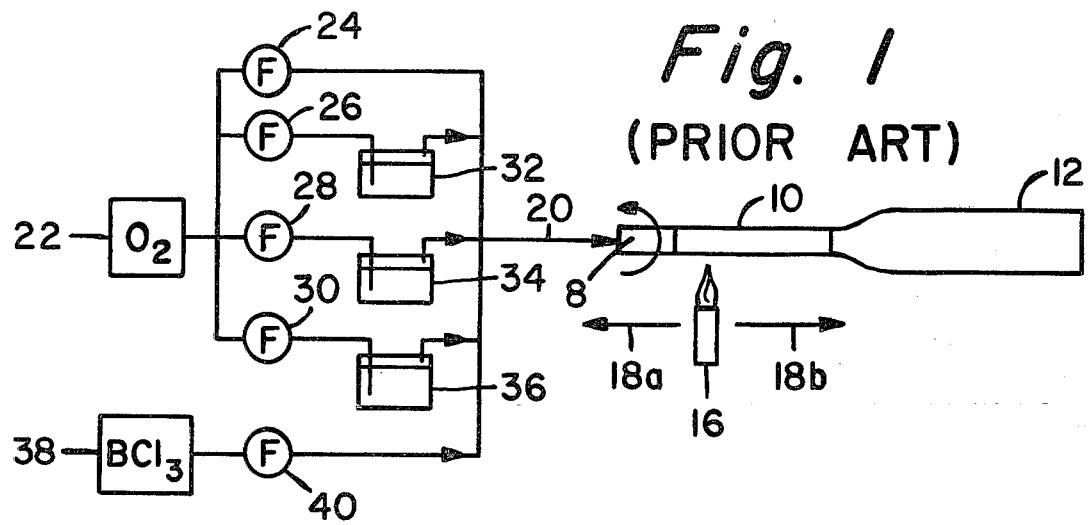
FIG. 1 is a schematic representation of a prior art apparatus for depositing a glass layer within a tube.
Figure 2:
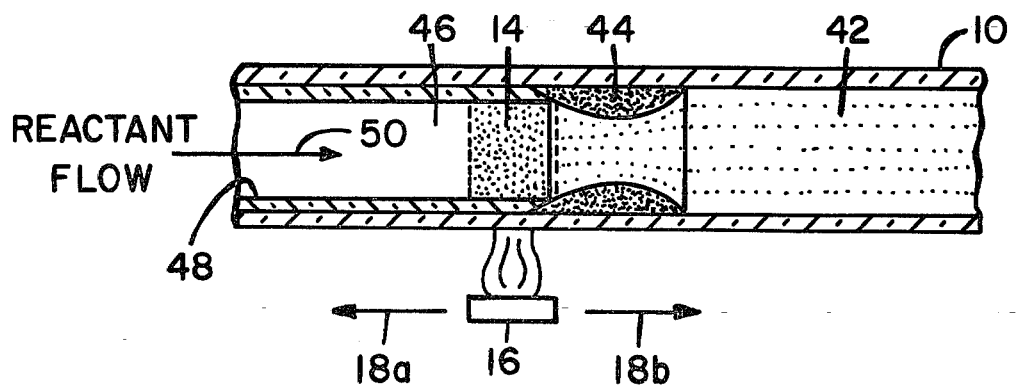
FIG. 2 shows a section of the tube of FIG. 1 depicting observed conditions during processing.

FIGS. 1 and 2 show a prior art system comprising a substrate or bait tube 10 having handle tube 8 affixed to the upstream end thereof and exhaust tube 12 affixed to the downstream end thereof. Tubes 8 and 12 are chucked in a conventional glass turning lathe (not shown), and the combination is rotated as indicated by the arrow. The handle tube 8, which may be omitted, is an inexpensive glass tube having the same diameter as the substrate tube, and it does not form a part of the resultant optical waveguide. A hot zone 14 is caused to traverse tube 10 by moving heating means 16 as schematically depicted by arrows 18a and 18b. The term "hot zone" is often used to refer to that portion of the bait tube which is sufficiently hot to cause it to glow, the temperature of that region being about 1100° C. or greater. The width of the hot zone depends upon such parameters as the size and speed of the burner. Heating means 16 can consist of any suitable source of heat such as a plurality of burners encircling tube 10. Since tube 10 is rotated, the temperature around the circumference is substantially uniform. Reactants are introduced into tube 10 via inlet tube 20, which is connected to a plurality of sources of gases and vapors. In FIG. 1, flow meters are represented by a circle having the letter "F" therein. A source 22 of oxygen is connected by flow meter 24 to inlet tube 20 and by flow meters 26, 28 and 30 to reservoirs 32, 34 and 36, respectively. A source 38 of boron trichloride is connected to tube 20 by a flow meter 40. Reservoirs 32, 34 and 36 contain normally liquid reactant materials which are introduced into tube 10 by bubbling oxygen or other suitable carrier gas therethrough. Exiting material is exhausted through exhaust tube 12. Not shown is an arrangement of mixing valves and shutoff valves which may be utilized to meter flows and to make other necessary adjustments in composition.

Burner 16 initially moves at a low rate of speed relative to tube 10 in the direction of arrow 18b, the same direction as the reactant flow. The reactants react in hot zone 14 to produce a powdery suspension of particulate oxidic material, often referred to as soot, which is carried by moving gas to region 42 which is downstream from the hot zone. A portion of the soot particles impinges upon and adheres to the bait tube wall, thus causing a soot buildup 44 in that portion of region 42 immediately downstream from the hot zone. The length of the buildup is generally about 1.5-2 times the diameter of the bait tube.

Figure 3:
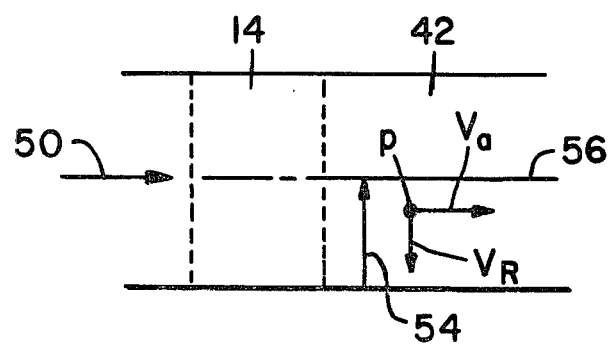
FIG. 3 is a schematic diagram illustrating the velocity components of a particle flowing in the deposition region of a substrate tube.

Because of the relatively high soot deposition efficiencies which have been observed, it has been evident that soot particles produced in region 14 remote from the tube walls are subjected to a force which imparts a radial velocity component to the particles. This phenomenon can be explained by referring to the diagram of FIG. 3. When reactants 50 flow into hot zone 14, soot particles are formed, one of which is shown as particle p. In hot zone 14 particle p and the gaseous products of reaction become heated. Thus, in region 42, wherein the temperature of the wall portion of tube 10 is lower than that of the flowing particles and gases, a temperature gradient exists between the wall and the tube axis 56 as indicated by arrow 54. Particle p has an axial velocity component $V_a$ due to the reactant flow which has the tendency to cause the particle to move through region 42 and into exhaust tube 12. However, the rate of soot deposition in region 42 is sufficiently high as to imply the existence of a force which imparts a velocity component $V_R$ to particle p which drives it toward the wall of tube 10. Of the various possible contributors to radial velocity component $V_R$, the thermophoresis component $V_t$ resulting from temperature gradient 54 has the greatest effect. For a discussion of this effect see the publication, P. G. Simpkins et al. "Thermophoresis:The Mass Transfer Mechanism in Modified Chemical Vapor Deposition", Journal of Applied Physics, Vol. 50, No. 9, September, 1979, pp. 5676-5681.

It is noted that essentially no soot is formed in region 46 of tube 10 upstream from hot zone 14. As burner 16 continues to move in the direction of arrow 18b, hot zone 14 moves downstream so that a part of soot buildup 44 extends into the hot zone and is consolidated thereby to form a unitary, homogeneous glassy layer 48. Such process parameters as temperatures, flow rates, reactants and the like are discussed in the publications J. B. MacChesney et al., Proceedings of the IEEE, 1280 (1974) and W. G. French et al., Applied Optics, 15 (1976). Reference is also made to the text *Vapor Deposition*, Edited by C. F. Powell et al., John Wiley and Sons, Inc. (1966).

When burner 16 reaches the end of tube 10 adjacent to exhaust tube 12, it quickly returns in the direction of arrow 18a to the input end of tube 10. Thereafter, additional layers of glassy material are deposited within tube 10 in the manner described above. After suitable layers have been deposited to serve as the cladding and/or core material of the resultant optical fiber waveguide, the temperature of the glass is increased to about 2200 C. for high silica content glass to cause tube 10 to collapse. This can be accomplished by reducing the rate of traverse of the hot zone. The resultant draw blank is then drawn in accordance with well-known techniques to form an optical waveguide filament having the desired diameter. Alternatively, the uncollapsed blank may be subsequently reheated and the hole collapsed, or the hole may be collapsed during the drawing process.

To optimize the process from the standpoint of reaction, high temperature are utilized in the deposition process. For the usual silica based system, temperatures at the substrate wall are generally maintained between about 1400° and 1900° C. at the moving position corresponding with the hot zone. Indicated temperatures are those measured by a radiation pyrometer focused at the outer tube surface.

It is commonly known that one of the factors which limits deposition rate is the rate of sintering deposited soot to form a transparent glass layer. For a given composition of glass to be deposited, there is a maximum layer thickness of glass that can be sintered using the optimal combination of hot zone width, peak temperature of the hot zone and burner traverse rate. If the thickness of the sintered glass layer can be kept to the maximum value for different value diameters, deposition rate increases proportionately with the tube inside diameter because of increased surface area. However, because of the nature of flow dynamics of the reactant vapor stream and soot particle dynamics, the percentage of produced soot which deposits in the substrate tube decreases with increased tube diameter.

Figure 4:
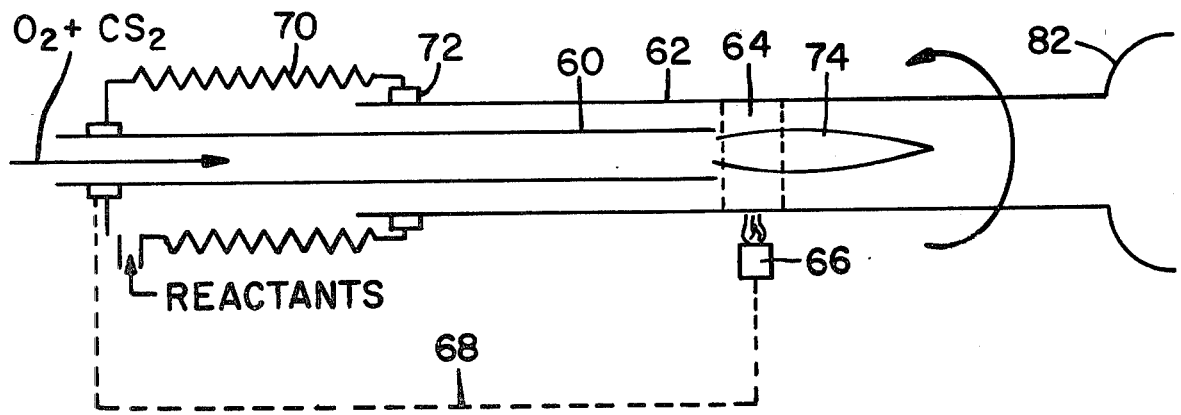
FIG. 4 is a schematic representation of an apparatus constructed in accordance with the present invention.

In accordance with the present invention means is provided for creating a gaseous mandrel which confines the flow of reactant vapors to an annular channel adjacent the bait tube wall in the hot zone while at the same time increasing the radial velocity component $V_t$ of the soot particles in that portion of the bait tube just downstream from the hot zone. An apparatus for performing this function is shown in FIG. 4 wherein a portion of axial burner tube 60 extends into that end of substrate or bait tube 62 into which the reactants are introduced. That portion of tube 60 within tube 62 terminates just prior to the hot zone 64 created by moving heat source 66. Tube 60 is mechanically coupled by means represented by dashed line 68 to burner 66 to ensure that tube 60 is maintained the proper distance upstream of hot zone 64. Alternatively, the heat source and burner tube may be kept stationary, and the rotating substrate tube may be traversed. The input end of tube 62 is connected to tube 60 by a collapsible member 70, a rotating seal 72 being disposed between member 70 and tube 62.

Figure 5:
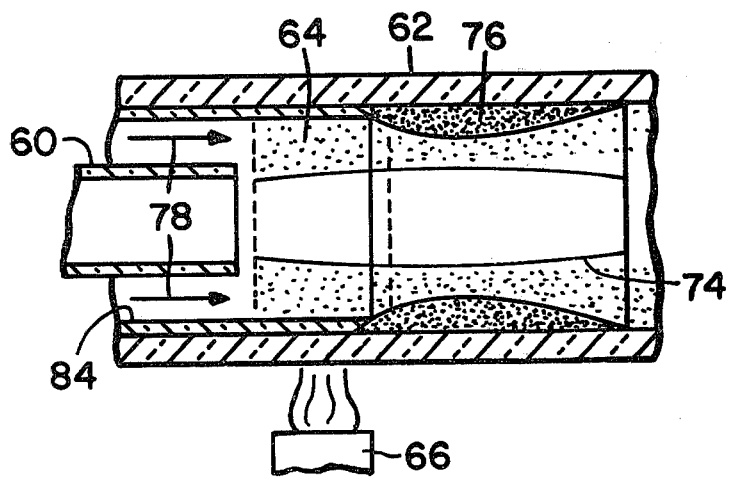
FIG. 5 is a detailed cross-sectional view of a portion of the apparatus of FIG. 4.

Tube 60 is supplied with oxygen and a gas such as $CS_2$, $SO_2$, CO or the like which is capable of generating a water-free flame 74 which emanates axially from the open end of tube 60 as illustrated in FIG. 4. Preferably, a pencil flame of the type illustrated in FIG. 4 extends through the hot zone and downstream therefrom. Burner tube 60 terminates upstream of the hot zone a sufficient distance to prevent the deposition of soot thereon, a distance of 2 to 7 cm being preferred. As shown in FIG. 5, which is a cross-sectional view of the hot zone and adjacent regions of tube 62, the flame emanating from tube 60, along with the hot gases generated thereby, provides an effective mandrel or barrier to the reactants flowing in the direction of arrows 78 between tubes 60 and 62, thereby confining those reactants to an annular channel adjacent the wall of tube 62 in hot zone 64. For some distance downstream from hot zone 64, the flame and hot gases from tube 60 continues to act as a barrier to soot formed in the hot zone, thereby enhancing the probability that such soot will deposit on the wall of tube 62 as shown at 76. In addition, the flame and hot gases generate a radial temperature gradient downstream from the hot zone which enhances the thermophoresis effect described above.

Because of the high operating temperatures within bait tube 62, tube 60 should be formed of a refractory material such as alumina, silica or the like. Since optical waveguides generally contain silica, and since other refractory materials may adversely affect the purity of the resultant product, silica is the preferred material.

Figure 6:
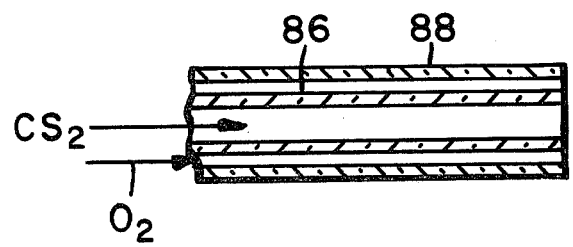
FIG. 6 is a cross-sectional view of a modified axial burner which can be employed in the apparatus of FIG. 4.

As shown in FIG. 6 a surface mixed axial burner can also be employed. In this embodiment, the hydrogen-free fuel gas such as $CS_2$ flows through centrally located tube 86, and oxygen flows through the region between tube 86 and the surrounding tube 88.

The embodiment of FIGS. 4 and 5 operates as follows. Reactants 78 flow through member 70 and into bait tube 62. The reactants are confined to an annular channel adjacent the bait tube wall as they flow into the hot zone from the region surrounding tube 60. In the hot zone the reactants form soot particles which are carried downstream toward exhaust tube 82. Because the soot particles and other reaction products have been heated in the hot zone, the soot particles are forced toward the cooler bait tube wall just downstream from the hot zone due to the thermophoresis effect described above. Since the products of reaction cool after leaving the hot zone, the thermophoresis effect would rapidly become negligible in a conventional apparatus. However, flame 74 generates a sufficiently high temperature to provide an appropriate radial thermal gradient in that region of the bait tube just downstream from the hot zone. Thus, deposition can occur in the same region as in the conventional vapor deposition process; however, the radial velocity of the soot is increased, and a larger percentage of available soot is driven to the bait tube wall in the deposition zone. Temperature as low as 800° C. within the axial region of the bait tube have been found to be effective to enhance deposition efficiency, the deposition efficiency increasing with increased temperature. As the hot zone moves downstream, it encompasses a portion of soot buildup 76 which is consolidated thereby to form a unitary, homogeneous glassy layer 84.

The method described above can be employed to form one or more layers on the inner surface of tube 62, which layers will form the cladding and/or core material of the resultant optical fiber waveguide. As described above, the temperature of tube 62 is increased to cause it to collapse, and the resultant draw blank is drawn to form an optical fiber waveguide.

I claim:

1. In the method of manufacturing an optical waveguide preform which comprises the steps of passing through a first tube a gas which, when heated, forms glass particles, and moving a heat source along the outside of said tube whereby at least a portion of said gas is converted to glass particles and at least a portion of said glass particles are deposited on the inside of said tube, the improvement which comprises positioning a tubular burner coaxially within said first tube such that a first open end of said tubular burner is within said first tube, reciprocatingly moving said first end of said burner with respect to said first tube, passing said gas between said first tube and said burner, maintaining said first end of said burner a fixed distance from and upstream of said heat source, and flowing from said first open end of said burner a fuel which generates an axial, water-free flame that extends through said hot zone and downstream therefrom.

2. The method of claim 1 wherein said fuel is selected from the group consisting of $CS_2$, $SO_2$ and CO.

3. The method of claim 1 wherein said heat source consolidates said deposited glass particles.

4. The method of claim 3 which further comprises the step of collapsing said first tube by heating said first tube after the consolidation of said glass particles.

5. In the method of manufacturing an optical preform which includes the steps of
 passing through a first tube a gas which, when heated, forms glass particles, and
 moving a heat source with respect to the outside of said first tube whereby at least a portion of said gas is converted to glass particles and at least a portion of said glass particles are deposited on the inside of said tube,
the improvement which comprises
 disposing a tubular burner having an open end axially within said first tube,
 moving said tubular burner with respect to said first tube while maintaining said open end of said burner, which is within said first tube, a fixed distance from and upstream of said heat source,
 passing said gas between said first tube and said burner, and
 flowing from said open end of said burner a fuel which generates an axial, water-free flame that extends downstream from said heat source where it increases the temperature gradient between the axis and wall of said first tube.

6. In an apparatus for manufacturing an optical waveguide preform which apparatus includes
 means for supporting a first tube,
 means for heating a portion of said first tube to form a hot zone therein,
 means for providing relative longitudinal movement between first tube and said heating means, and
 means for introducing into said first tube a reactant gas mixture which flows through said hot zone and, when heated therein, forms glass particles at least a portion of which flows downstream from said hot zone where at least a portion thereof comes to rest on the inner surface of said first tube in a region thereof that is cooler than that portion of said first tube that surrounds said hot zone,
the improvement which comprises burner means having an axial orifice in a first end thereof that is disposed in said first tube for generating a water-free flame that extends axially from said axial orifice through said hot zone and downstream therefrom.

7. An apparatus in accordance with claim 6 wherein said burner means comprises
 a tubular burner having said first end terminating upstream of said hot zone,
 means for moving said first end of said burner with respect to said first tube,
 means for maintaining a relatively fixed relationship between said heating means and said first end of said burner, and
 means for flowing into the remaining end of said burner a hydrogen-free fuel.

8. An apparatus in accordance with claim 7 wherein said burner comprises a tube of refractory material.

9. An apparatus in accordance with claim 7 wherein said burner comprises a pair of coaxial tubes of refractory material.

10. In an apparatus for manufacturing an optical preform which apparatus includes means for supporting a first tube, means for heating an outside portion of said first tube, and means for providing movement between said first tube and said heating means, the improvement which comprises
 burner means disposed in said first tube, said burner means having an orifice disposed on the axis of said first tube for generating a water-free flame that extends axially through that portion of said first tube adjacent said heating means,
 means for passing a gas, which, when heated, forms glass particles, between said first tube and said burner means,
 means for moving said burner means with respect to said first tube, and
 means for maintaining a relatively fixed relation between said heating means and said burner means, said burner means terminating short of said heating means.

* * * * *